June 10, 1969 M. CAMRAS 3,449,529

ERASE HEAD

Filed Aug. 2, 1965

INVENTOR.
MARVIN CAMRAS

BY Hill, Sherman, Meroni, Gross & Simpson
ATTORNEYS

United States Patent Office 3,449,529

Patented June 10, 1969

3,449,529

ERASE HEAD

Marvin Camras, Glencoe, Ill., assignor to IIT Research Institute, Chicago, Ill., a corporation of Illinois Filed Aug. 2, 1965, Ser. No. 476,438
Int. Cl. G11b *5/00;* G01d *15/12*
U.S. Cl. 179—100.2 3 Claims

ABSTRACT OF THE DISCLOSURE

An erase head particularly for operation at tape speeds of the order of sixty inches per second wherein a last unidirectional field reverses the polarity of magnetization of the tape relative to the next previous saturating magnetic field to offset the latent memory of such saturation in a subsequent alternating erasing field treatment. A head construction is used having one or more poles projecting into an aperture in a keeper surface, the keeper material forming part of the useful magnetic circuit for erase or signal flux. An erase head configuration for erasing composite audio-video signals is shown.

*Cross-reference to related application*

Reference is made to my copending application Ser. No. 439,340 filed Mar. 12, 1965, in compliance with the requirements of 35 U.S.C. 120 in order to establish an earlier effective filing date for certain of the subject matter of the present application.

This invention relates to an erase head and particularly to an erase head for wide band tape recording systems involving relatively high tape speeds of the order of sixty inches per second and up to 120 inches per second.

One of the main obstacles to the introduction of higher coercive force record media is that they cannot be erased by ordinary erase heads. Increasing the input current amplitude does not help since the heads are already operating at or near saturation. The full cross section of the head core is not utilized because of the skin-effect at high erase frequencies. Also there can be a re-recording effect where the tape is leaving the erase field.

In accordance with one embodiment of the present invention, an erase head includes a first direct current section which includes a field strong enough to magnetize the tape to saturation and to obliterate any previously recorded signal. The tape then passes through a high frequency section which demagnetizes the record medium and leaves it in a substantially noise-free condition. The magnetic housing provides a "keeper" record medium engaging surface that shunts the unerased record medium to prevent any re-recording effects.

It is therefore an important object of the present invention to provide an improved demagnetizing apparatus and method.

It is another object of the present invention to provide a demagnetizing apparatus and method capable of more effectively erasing existing magnetic record media and capable of erasing higher coercive force record media.

Still another object of the present invention is to provide an improved erase head apparatus and method for erasing record media which are operated at relatively high speeds of the order of 60 inches per second.

Other objects, features and advantages of the present invention will be apparent from the following detailed description taken in connection with the accompanying drawings, in which.

*Description of the preferred method of erasing in accordance with the present invention*

Figure 1:
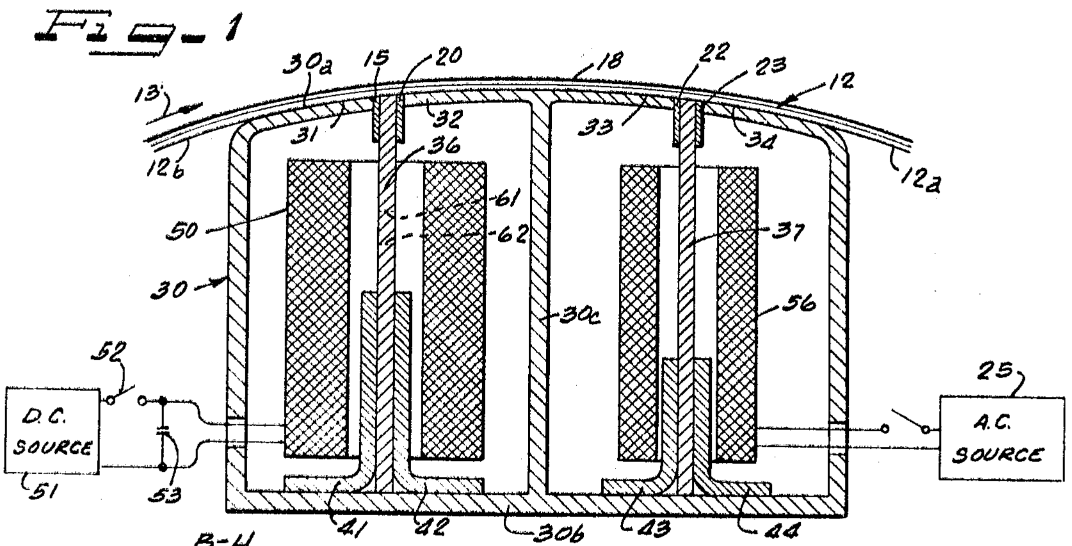
FIGURE 1 is a diagrammatic illustration of an erase head construction in accordance with the present invention as adapted for use with a moving lengthy magnetic tape record medium.

Considering a magnetic record medium having the configuration of the magnetic tape record medium 12 in FIGURE 1, various signal field intensities are recorded along the length of the magnetizable layer 12*a* of the record medium. The signal fields on the record medium will have been produced by means of a record head which generates fields intersecting a record medium path thereacross and having a predetermined direction relative to the record medium. The recording head fields may be directed longitudinally of the record medium path as in the video tape recording system of my copending application U.S. Ser. No. 401,832 filed Oct. 6, 1964, and the principles of the present invention are applicable to recorded magnetic tapes as produced by such a system. Thus, the recorded fields on the tape record medium 12 may extend generally parallel to the arrow 13 in FIGURE 1, and the record medium may have been moved in the direction of its length corresponding to the direction of arrow 13 during the recording process.

On the other hand, the recording head may itself be moved transversely to the direction of tape movement, and may produce magnetic recording fields which are directed generally in the direction of head movement, where the head velocity greatly exceeds the velocity of the record medium. In this event the recorded fields on an elongated tape record medium would extend transversely to the direction of tape movement. The erase head may track the path of the record head and thus the erase fields may be directed generally parallel to the direction of the recorded fields, or the erase head may be fixed and have its fields directed longitudinally of the path of the record medium thereacross and transversely to the direction of the recorded signal fields on the record medium.

In general a given tape recording system will be capable of applying only a limited maximum value of signal field strength H to the record medium less than that required to drive the magnetic material of the record medium fully to the saturation value $B_s$; such system maximum value of applied signal field strength H will produce what will be termed the maximum signal residual magnetization level for the system. The record medium itself, if subjected to an applied field H such as to magnetize the record medium to the theoretical saturation value $B_s$, would then exhibit a level of residual magnetization after removal of the applied field higher than the maximum signal residual magnetization level for the practical head-tape system.

Figures 2, 3, 4, 5, 6:
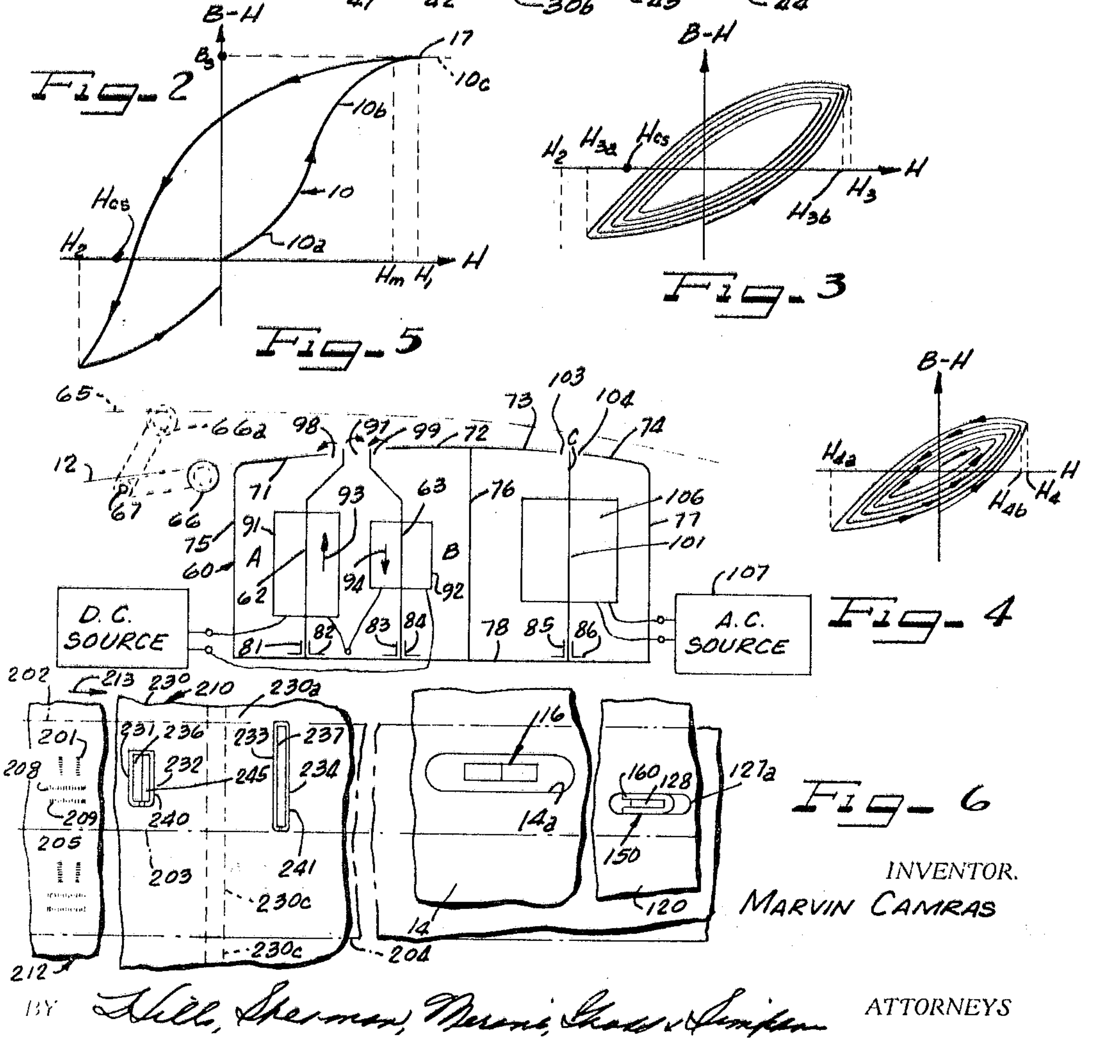
FIGURE 2 is a diagrammatic indication of the effect of the direct current erasing field on the moving magnetic tape record medium of FIGURE 1.
FIGURE 3 is a diagrammatic indication of the effect of the first alternating current erasing field on the moving record medium.
FIGURE 4 is a diagrammatic indication of the effect of the second alternating current erasing field on the moving record medium in FIGURE 1.
FIGURE 5 is a diagrammatic illustration of a modified form of erase head apparatus in accordance with the present invention.
FIGURE 6 is a diagrammatic plan view of an erasing head for one channel of a multichannel video recording system.

If a magnetic record medium is placed in a demagnetized condition and then subjected to an applied magnetic field H, the intrinsic induction B minus H $(B-H)$ of the magnetic material will vary with increasing values of applied magnetic field H in accordance with the initial portion 10$a$ of the curve 10 of FIGURE 2. As the applied magnetic field H is increased, the intrinsic induction B minus H curve exhibits a relatively distinct bend at 10$b$ and then follows the dash line portion indicated at 10$c$ in FIGURE 2 which approaches a finite limit, commonly referred to as saturation. The limit of B minus H at saturation is designated $B_s$.

Thus in a practical recording system demagnetizing fields actually equal to $B_s$ will never be required. Practical demagnetizing fields for a given system need only exceed that required to produce the maximum signal residual magnetization level for the system. In general the maximum signal residual magnetization level may correspond to an applied recording field strength $H_m$ beyond the bend 10$b$ of the normal magnetization curve 10 in what may be termed the saturation region as represented by curve part 10$c$.

Demagnetizing field strength amplitudes in this saturation region may be difficult to achieve in alternating current erase heads of practical design because of core losses, limited oscillator power, or skin effect at high erase frequencies. In video and other wide band recording systems utilizing fixed recording heads, the tape speed may be as high as 120 inches per second, and erasing frequencies in the megacycle range may be required. Further, tapes of higher coercive force than those presently in use are advantageous so that it is desirable to have an erase head capable of effectively erasing such higher coercive force record media.

A basic concept of the present invention is applicable to reduce the residual magnetization level of a record medium operating in a system having a predetermined maximum signal residual magnetization level and a corresponding applied maximum recording field intensity $H_m$. The concept comprises first subjecting the record medium to a first unidirection (non-alternating) magnetic field such as provided across the gap 15 in FIGURE 1 and corresponding to a field intensity $H_1$ equal to or greater than $H_m$. The value $H_1$ is preferably in the saturation range as indicated in FIGURE 2. The recording fields may be applied by means of a ring-type recording head contacting the active surface 12$b$ of the magnetizable layer 12$a$ of the tape record medium 12 so that the maximum field intensity for the recording head-tape system will vary through the thickness of the magnetizable layer 12$a$. In this case the curve of FIGURE 2 may be taken to represent the portion of the thickness of the record medium subjected to the most intense part of the recording field. This will generally be the magnetizable material at the active surface 12$b$, and the value $H_m$ will then be the maximum recording field intensity applied at the region near the active surface.

The field intensity $H_1$ will drive the record medium material to a point such as indicated at 17 in FIGURE 2 to substantially obliterate any signal previously recorded on the record medium. Preferably the demagnetizing field configuration applied to the magnetizable layer 12$a$ will generally conform to the recording field configuration which produced the recording to be erased, particularly as to any gradient through the thickness or cross section of the magnetizable material. Thus the field across gap 15 in FIGURE 1 will provide a more intense field near the active surface 12$b$ and a less intense field near the non-magnetic base 18. When the magnetizable material near the active surface 12$b$ of the record medium is adequately erased, the remaining portions of the record medium contributing in any substantial degree to the reproduced output from the record medium will also be adequately erased. (The claims will be directed to the region of the record medium which is subjected to the maximum recording field intensity $H_m$ where the recording head has a field of varying intensity at different regions of the record medium cross section.)

After being subjected to a first unidirectional magnetic field of intensity $H_1$ and of a first polarity or orientation the record medium is next subjected to a second unidirectional magnetic field, for example at a gap 20 in FIGURE 1, having a different polarity or orientation and a second field intensity $H_2$. While the record medium may be subjected to more than two unidirectional fields of the same or different polarity or orientation the last unidirectional field applied will have a field intensity less than $H_m$ and be of an orientation such that the record medium will be left with a residual magnetization level substantially less than the maximum signal residual magnetization level for the system. The successive unidirectional field orientations need not differ by 180°, but may change by successive angles less than 180° so long as the end result is a magnetization level in the record medium which is substantially less than the maximum signal level and is within the erase capabilities of the succeeding alternating polarity erase field or fields to which the record medium is subjected.

It is preferable to have the final unidirectional field acting in an opposite orientation from the next previous saturating magnetic field, and it is also preferable that the tape leave the unidirectional field section of the erase head with a level of magnetization substantially above zero. The record member exhibits a latent memory of its last saturation magnetization, which latent memory becomes operative when the record medium is thereafter subjected to an alternating magnetic field, particularly one whose maximum amplitude is below the saturation region. In effect the alternating field acts as a belated bias field and results in the recording on the record medium of a signal in accordance with the past history of the magnetic material. Where the unidirectional fields themselves reduce the magnetization to near zero, a following alternating magnetic field will produce a substantially greater net recording effect than if the unidirectional fields leave the record medium magnetized to a level substantially above zero and with a polarity opposite to the polarity of the last applied saturating field. This can be visualized as a cancellation between the effect of the reduced level opposite magnetization and the saturation-memory effect.

After a reduced level of opposite magnetization substantially less than the maximum signal residual magnetization level but substantially greater than zero has been established by means of two or more unidirectional (non-alternating) magnetic fields, the record medium is passed through at least one and preferably two alternating polarity magnetic fields having peak intensities in the record medium path which cannot be maintained at a value to reliably erase the maximum signal magnetization level but which are of intensity to reliably erase the reduced level of magnetization produced by the action of the unidirectional magnetic fields. (In this connection possible variations in head-tape contact must be taken into account.) The alternating polarity magnetic field produced at gap 22 in FIGURE 1 may have a peak amplitude such as indicated at $H_3$ which is substantially less than $H_m$ but is preferably equal to or greater than the coercivity $H_{cs}$ for the material of the record medium. (The coercivity $H_{cs}$ is the coercive force of the record medium corresponding to intrinsic saturation induction $B_s$ of the material.)

In accordance with the preferred method of the present invention, the record medium is subjected to at least ten cycles of alternating current magnetomotive force while passing through the alternating magnetic field treatment zone, this zone in the illustrated embodiment including the fields at gaps 22 and 23.

Thus referring to FIGURE 3 as an incremental portion of the record medium 12 reaches the most intense region of the field at gap 22, said portion will experience a magnetic field intensity $H_3$ followed by a field intensity $H_{3a}$ of opposite polarity from $H_3$ and of slightly reduced magnitude. Next said record medium portion will experience a field intensity $H_{3b}$ of the same polarity as $H_3$ and of a further reduced amplitude. For purposes of diagrammatic illustration, five cycles have been shown in FIGURE 3.

Similarly in FIGURE 4 for purposes of diagrammatic illustration it is assumed that the record medium portion is subjected to a maximum amplitude $H_4$ of field intensity followed by progressively decreasing amplitudes such as $H_{4a}$ and $H_{4b}$ over five cycles until as the portion of the record medium reaches a point remote from gap 23, the field intensity has reduced essentially to zero and the record medium is in a demagnetized condition. Ten effective cycles are thus diagrammatically indicated in FIGURES 3 and 4 together.

As a specific example, where the record medium travels at 120 inches per second, and the frequency of A.C. source 25 is 4 megacycles per second, if the effective length of the first A.C. erase field gap 22 is 4.8 mils this would correspond to subjecting the record medium to 160 cycles of alternating current magnetomotive force. If the gap 23 had an effective length of 1.2 mils, for example as a result of a gap length approximately ¼ the gap length of gap 22, the record medium portion would there be subjected to 40 more cycles of alternating current magnetomotive force. Even if the record medium speed were 30 inches per second, the gap 23 would still subject the record medium to 10 cycles before the amplitude of the erase field acting on said portion became negligible.

*Description of the erase head apparatus of FIGURE 1*

Referring to the erase head apparatus of FIGURE 1, there is illustrated a housing 30 of magnetic material providing extended area keeper surfaces such as indicated at 30*a* engaging over the entire surface of the record medium which is being erased both at the leading side of gap 15, between the gaps 20 and 22 and at the trailing side of the gap 23. The housing may provide poles 31–34 having a width transverse to the direction of tape movement corresponding to the width of the center poles 36 and 37. The sides of the housing 30 may be open, or other means may be provided for preventing a magnetic flux short circuit between poles 31 and 32 and the center pole 36 and between poles 33 and 34 and the center pole 37.

In the illustrated embodiment angle pieces 41–44 provide for low reluctance magnetic connection between center legs 36 and 37 and the bottom wall 30*b* of the housing 30. A partition 30*c* of magnetic material is illustrated providing a return path for the magnetic circuit including gap 20 and for the magnetic circuit including gap 22.

A direct current winding 50 is energized from a direct current source 51. The amplitude of the direct current from source 51 is selected in relation to the sizes of gaps and the reluctances of the associated magnetic circuits so that the magnetic field intensity across the first gap 15 in the path of the magnetizable layer 12*a* has a value such as $H_1$ in FIGURE 2, while the field intensity in the magnetizable layer at the gap 20 has a lesser value below the saturation range such as indicated at $H_2$ in FIGURE 2.

A switch is indicated at 52 for connecting the direct current source 51 with the winding 50 and also for charging a capacitor 53. When switch 52 is opened, the value of capacitor 53 is such in relation to the inductance of winding 50 as to produce an oscillatory discharge for substantially demagnetizing the direct current magnetic circuits linked to winding 50.

An alternating current source is indicated at 25 connected to the alternating current winding 56 on center leg 37. As previously indicated, the frequency of the alternating current source 25 may be in the megacycle range where the velocity of the record medium relative to the head is of the order of 60 inches per second. Also as previously indicated, preferably the maximum amplitude of field intensity in the region of gap 22 is equal to or greater than the coercive force of the record medium magnetizable layer and is substantially greater than the peak amplitude of field intensity $H_4$ at the gap 23.

*Description of the embodiment of FIGURE 5*

In the embodiments of FIGURES 1 and 5, where the record medium is to travel in contact with the housing 30 or 60 during playback, means should be provided such as suitable core demagnetizing windings or by design of the erase heads to provide for a minimum residual magnetization of the erase head cores. In this connection, an auxiliary gap may be provided in the direct current magnetic circuit of FIGURE 1 in the center leg 36 between the dash lines 61 and 62, for example. Similar auxiliary gaps could be provided in the legs 62 and 63 of the erase head of FIGURE 5, or in the alternative or additionally, means may be provided for changing the path of the record medium 12 during playback operation to a path such as indicated at 65 out of contact with the erase head housing 60. The means is indicated diagrammatically as comprising a guide 66 pivotally mounted at 67 so as to be shiftable from a solid position for erasing operation to a dotted position indicated at 66*a* during a playback operation. The record medium may follow the path 65 also during any rewind operation or any other operation where the erasing function is not required.

In the embodiment of FIGURE 5, the housing 60 may have open sides as described in connection with the housing 30 and provide poles 71, 72, 73 and 74 as well as flux path legs 75, 76 and 77 and a base leg of magnetic material 78. The angle members 81–86 are of magnetic material as were the angle members 41–44 in FIGURE 1.

Direct current windings 91 and 92 produce unidirectional magnetomotive forces in the directions of arrows 93 and 94 so as to be in aiding relation with respect to a center gap 97. The gaps 97 and 98 may provide field intensities in the path of the record medium during erase operation in the saturation range, while the erase field at gap 99 may be of reduced amplitude corresponding to the intensity $H_2$ in FIGURE 2. In this case, the field at gap 98 would place the record medium in the saturation range with one direction of magnetization, the gap 97 would place the record medium in the saturation range with an opposite polarity of magnetization, and the field at gap 99 would then reduce the level of magnetization of the tape to a residual value substantially below the maximum signal residual value but substantially above a zero magnetization level and with a direction of magnetization opposite to that of the last field in the saturation range which acts on the record medium.

The alternating current erasing circuit including center leg 101 in conjunction with the poles 73 and 74 defines erasing gaps 103 and 104 which may have alternating current magnetic fields of intensities as described in connection with the embodiment of FIGURE 1. The alternating current winding 106 is energized from an alternating current source 107 which may operate in the megacycle range as in the embodiment of FIGURE 1.

The method of operation for the embodiment of FIGURES 1 and 5 is preferably in accordance with the preferred method concept as heretofore described in detail having reference to FIGURES 2–4 of the drawings.

An important concept in the embodiment of FIGURE 5 is to adjust the number of turns and positions of windings 91 and 92 so that the direct current component of magnetic field set up at the gaps 103 and 104 is minimized. Suitable magnetic compensating coils may be provided for further minimizing this direct current component at the alertnating current section of the head assembly. The "keep" action of the magnetic housing 60 shunts the record medium as it leaves the gap 104, particularly, to prevent any re-recording effects.

It will be apparent that the concepts of the present invention may be applied to record media of other configurations, such as disks, wires, cylinders and the like.

A unidirectional magnetic field may be produced by a unidirectional electric current flowing in a winding or by means of a permanent magnet.

FIGURE 6 illustrates how the erase head configuration of FIGURE 1 might be used to erase a single channel of a record medium 212 of a multichannel video recording system such as disclosed in my copending application Ser. No. 439,340 filed Mar. 12, 1965.

The reference numerals 14, **14*a*, 16, 120, 127*a*, 128, 150 and 160 in FIGURE 6 are applied to parts of video and audio recording heads which received identical reference numerals in my application Ser. No. 439,340. The video head unit 16 records longitudinally directed video fields as indicated at 201 in a channel of tape 212 between dot-dash lines 202 and 203. A second channel of the record medium 212 may be located between dot-dash lines 203 and 204 and may have a video track as indicated at 205**.

The center pole 128 of audio head unit 150 is spaced from housing 120 by a non-magnetic spacer strip 160 wrapped about the pole so as to record laterally directed audio fields in a pair of tracks such as indicated at 208 and 209 for the first channel.

The erase head 210 has a center pole 236 with a direct current winding corresponding to winding 50 in FIGURE 1 and has a center pole 237 with an A.C. winding corresponding to winding 56 in FIGURE 1. The D.C. energized center pole 236 may have a non-magnetic electrically conductive spacer strip 240 and the A.C. energized pole 237 may have a similar gap spacer strip 241. Each strip may be of copper sheet and may have its opposite ends spaced slightly to avoid a short circuit turn about the associated center pole, the resistance of the path spanning the ends of each strip being of a suitable high value for this purpose also.

A further non-magnetic gap spacer strip is shown at 245 so that the gap at the trailing side of pole 236 (corresponding to gap 20 in FIGURE 1) is of substantially greater length than the gap at the leading side of pole 236 (corresponding to gap 15 in FIGURE 1).

As illustrated in FIGURE 6, the A.C. center pole 237 is preferably wider than the D.C. center pole 236 and is preferably arranged with respect to the D.C. pole 236 and the tape path so that center pole 237 extends substantially laterally beyond both margins of the tape portion acted upon by center pole 236. As shown, the opening in the housing surface **230*a* receiving center pole 237 is substantially coextensive with the width dimension of one channel of the record medium and the center pole 237 has a dimension transverse to the direction of tape movement (indicated by arrow 213) slightly less than the channel width. The video recording head 16 and audio head unit 150 overall preferably occupy a region which is substantially centered with respect to the portion of the tape crossing the D.C. center pole 236, with the center pole 236 preferably having a width and position such that the margins of the tape portion crossing center pole 236 will lie slightly beyond the upper margin of head unit 16 and slightly below the lower margin of audio pole 128** (as viewed in FIGURE 6).

For the embodiment of FIGURE 6, the housing 230 may completely enclose the windings except for the openings for poles 236 and 237. The head of FIGURE 1 may be arranged to have a top plan view identical to FIGURE 6 with closed sides for the housing as in FIGURE 6. The wall **30*c*, 76 or 230*c* may extend completely across the housing. Preferably the D.C. and A.C. sections may be completely enclosed in separate housings having respective individual walls in place of a common wall such as 30*c*, 76 or 230*c***, and closed sides.

For single channel erasing, the center poles such as 36, 37, 62, 63, and 101 may extend laterally substantially beyond both margins of the tape, so that any edge effects at the lateral margins of the center poles do not affect the tape. In a single channel erase head, the lateral margins of the center poles are preferably beyond the recorded signal tracks. Further edge effects at the lateral margins of the center poles may be negligible even if within the scanning range of the playback head.

In each of FIGURES 1, 5 and 6 the pole configuration and relative gap sizes are selected to carry out the preferred method. As an example of expedients to reduce the magnitude of the second unidirectional magnetic field compared to the magnitude of the first, the leading edge of the trailing pole 32, 72 or 232 may be rounded and/or the trailing pole may be spaced slightly below the surface of the leading and center poles with a non-magnetic layer thereon engaging the active undersurface of the tape and spacing it from the trailing pole face.

It will be apparent that many modifications and variations may be effected without departing from the scope of the novel concepts of the present invention.

I claim as my invention:

1. An erase head comprising means for subjecting a magnetic record medium to a plurality of unidirectional magnetic fields to substantially obliterate any signal magnetization thereon and to place said record medium in a state of substantially uniform magnetization, and means for thereafter subjecting said record medium to an alternating current magnetic field treatment to reduce the level of residual magnetization of the record medium substantially to zero, characterized in that said first mentioned means provides a next previous saturating magnetic field acting on the record medium, and provides a last unidirectional magnetic field acting on the record medium last as the record medium leaves said first mentioned means which last unidirectional magnetic field has a last field direction with substantially an opposite orientation in comparison to the next previous saturating magnetic field produced by said first mentioned means and has a last field amplitude substantially less than that producing saturation and of magnitude greater than the coercivity of the record medium to magnetize the record medium to a level of residual magnetization substantially greater than zero and having an orientation corresponding to said last field direction and substantially opposite to the direction of said next previous saturating magnetic field, thereby to offset the effect of the latent memory of said next previous saturating magnetic field on the record medium as it travels through said alternating current magnetic field treatment.

2. In apparatus for treating magnetic record media which have been subjected to recording field intensities not greater than a given maximum recording magnetic field intensity, means defining a path of movement relative to said apparatus along which a magnetic record medium extends as it is brought into operative relation relative to said apparatus, means for establishing at least first and second unidirectional magnetic fields disposed successively along said path and extending generally parallel thereto, with the successive unidirectional magnetic fields having substantially opposite orientations where they intersect said path, with the first unidirectional magnetic field having a magnitude in the record medium path at least substantially equal to said maximum recording magnetic field intensity to substantially obliterate any previous recording on said record medium, and with the second unidirectional magnetic field having a magnitude substantially less than the magnitude of said first unidirectional magnetic field but greater than the coercivity of the record medium so as to magnetize said record medium with an opposite direction of residual magnetization and at a level substantially greater than zero but substantially less than the residual magnetization produced by said maximum recording magnetic field intensity for said media, and means for thereafter subjecting a record medium having such residual magnetization and relatively moving along said record medium path to an alternating current magnetic field having an amplitude in said record medium path less than said maximum recording magnetic field intensity but of an amplitude to substantially reduce the residual magnetization of the record medium as compared to the level of residual magnetization established in the record medium by said second unidirectional magnetic field.

3. The method of treating magnetic record media which have been subjected to recording magnetic field intensities not greater than a given maximum recording magnetic field intensity, which comprises first passing a magnetic record medium through a first unidirectional magnetic field having a magnitude at least substantially equal to said maximum recording magnetic field intensity to substantially uniformly magnetize said record medium in the direction of said first unidirectional field, second subjecting the record medium to a second unidirectional magnetic field having a direction substantially opposite to the direction of the first unidirectional magnetic field and having a magnitude greater than the coercivity of the record medium but substantially less than the magnitude of the first unidirectional magnetic field and less than said maximum recording magnetic field intensity to magnetize the record medium in the opposite direction with a reduced but substantial level of residual magnetization, and thereafter passing the record medium having such level of residual magnetization through an alternating current erasing field treatment zone and therein subjecting the record medium to at least ten cycles of alternating magnetomotive force in the absence of any signal field to further substantially reduce the maximum possible recorded magnetic field intensity on the record medium.

References Cited

UNITED STATES PATENTS

| | | | |
|---|---|---|---|
| 2,688,663 | 9/1954 | Munroe | 179—100.2 |
| 2,736,775 | 2/1956 | Camras | 179—100.2 |
| 2,784,259 | 3/1957 | Camras | 179—100.2 |
| 3,233,046 | 2/1966 | Moehring | 179—100.2 |

FOREIGN PATENTS

| | | |
|---|---|---|
| 368,942 | 6/1963 | Switzerland. |

BERNARD KONICK, *Primary Examiner.*

J. R. GOUDEAU, *Assistant Examiner.*

U.S. Cl. X.R.

340—174.1; 346—74